United States Patent [19]

Lewis

[11] 3,971,332

[45] July 27, 1976

[54] VEHICLE PARTS INDICATING INSTRUMENT

[76] Inventor: Gerald F. Lewis, 1850 Columbia, Berkley, Mich. 48072

[22] Filed: Dec. 5, 1974

[21] Appl. No.: 529,971

[52] U.S. Cl............................ 116/114 AM; 73/406; 73/515; 116/56; 116/114 PV
[51] Int. Cl.² ................. B60Q 11/00; G01L 19/12; G01P 15/00
[58] Field of Search ............ 73/406, 419, 515, 407, 73/500, 115; 116/56, 70, 114 AE, 114 H, DIG. 7, 37

[56] References Cited
UNITED STATES PATENTS

| 1,779,685 | 10/1930 | Washburne | 73/515 |
| 3,142,989 | 8/1964 | Bristol, Sr. | 73/407 |
| 3,556,043 | 1/1971 | Vayda | 116/114 PV |
| 3,910,222 | 10/1975 | Metivier | 137/557 |

FOREIGN PATENTS OR APPLICATIONS

| 861,012 | 2/1959 | United Kingdom | 73/407 |

Primary Examiner—Richard C. Queisser
Assistant Examiner—Daniel M. Yasich
Attorney, Agent, or Firm—Fisher, Gerhardt & Groh

[57] ABSTRACT

An indicating instrument for vehicles incorporating a piston which is so arranged that a slight movement causes a much larger displacement of a liquid level in a liquid column which is visible through a transparent housing of the instrument. In one embodiment the piston is movable in response to intake manifold pressure of an engine to indicate the efficiency of fuel utilization and in another embodiment, the piston is movable in response to a pendulum to indicate that the vehicle is either accelerating or decelerating.

13 Claims, 4 Drawing Figures

VEHICLE PARTS INDICATING INSTRUMENT

BACKGROUND OF THE INVENTION

This invention relates to indicating instruments for vehicles and particularly to instruments for indicating instantaneous fuel utilization or acceleration and deceleration of a vehicle.

Various forms of indicating instruments for vehicles, particularly instruments for indicating fuel consumption or the efficiency of fuel consumption in absolute values have been devised. However, such instruments usually are very complex and consequently are expensive to manufacture and to maintain in operation.

A need exists for a simple, economical instrument to indicate, in relative values, the efficiency of fuel use at different operating speeds and engine loading which need not be exact and accurate but which will give an operator a basis for comparison of different operating conditions.

SUMMARY OF THE INVENTION

It is an object of the invention to provide an economical indicating instrument by which the effectiveness of fuel use or of acceleration or deceleration of a vehicle may be readily observed by an operator of the vehicle.

It is another object of the invention to provide an indicating instrument in which the level of a column of liquid is changed over a relatively wide range in response to a much smaller movement of a liquid displacing member which in turn is moved in response to changes in the operating characteristics of a vehicle.

An indicating instrument is provided which is fabricated of simple plastic parts and which is so arranged that a piston moves a slight amount to cause a much larger displacement of the liquid level in the liquid containing groove which is visible through the transparent housing of the instrument. The piston is movable in response to intake manifold pressure of an engine to indicate the efficiency of fuel utilization and in another embodiment of the invention, the piston is movable in response to a pendulum to indicate that the vehicle is either accelerating or decelerating.

DETAILED DESCRIPTION

Figure 1:
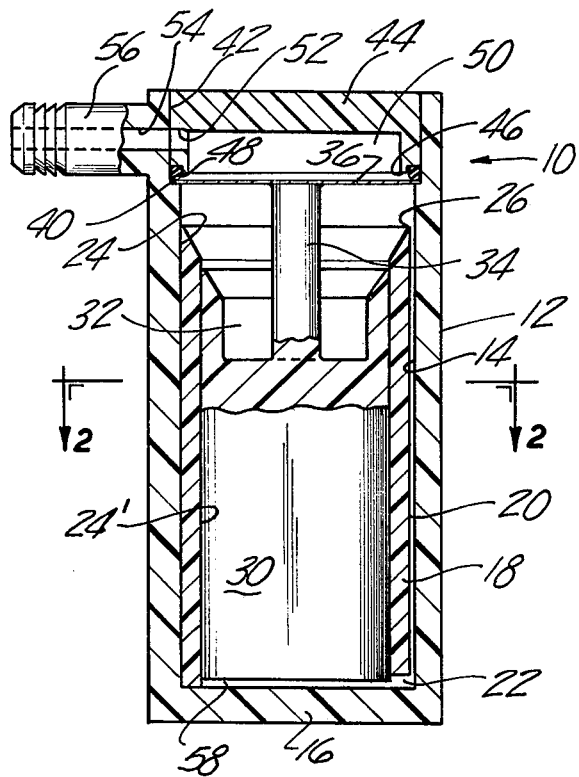
FIG. 1 is a cross-sectional view of the indicating instrument embodying the invention.
Figure 2:
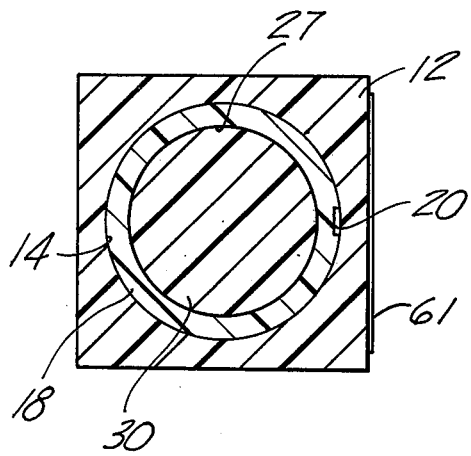
FIG. 2 is a cross-sectional view of the indicating instrument taken on line 2—2 in FIG. 1.

Referring to the drawings, an indicating instrument which may be termed a gauge, and which embodies the invention is designated generally at 10 and is particularly adapted for use with vehicles to indicate the efficiency of fuel use or acceleration and deceleration of the vehicle.

The gauge 10 includes a housing 12 having a bore 14 closed at its bottom end by an end wall 16.

Disposed within the bore 14 of the housing 12 is a generally tubular sleeve 18 which may be pressed-fit into the bore 14 or otherwise fixed into position so that the lower end of the sleeve 18 engages the bottom wall 16. The outer surface of the sleeve 18 is provided with a groove 20 which extends longitudinally for the full length of the sleeve 18.

Adjacent to the lower end of the groove 20, the wall of the tubular sleeve 18 is provided with a notched portion 22 so that communication is provided between an interior bore 24' of the tubular sleeve member through the notch 22 and to the groove 20. The upper end of the tubular sleeve 18 has an inwardly tapered portion 24 to form an annular lip 26 at the upper end of the sleeve 18.

Disposed within the interior bore 24' of the tubular sleeve 18 is a piston 30 which occupies a substantial portion of the tubular member 18. The upper end of the piston has a cavity 32 which forms a liquid reservoir to be later described. A piston rod 34 extends from the piston 30 and has its upper end connected to a central underside portion of a diaphragm 36 in any conventional manner such as by an adhesive.

The diaphragm 36 is preferably made of metal, such as brass, and is relatively thin and flexible. The diaphragm 36 is positioned in the housing 12 with its circumferential outer edge portion in engagement with a shoulder 40 formed between the bore 14 and an enlarged bore portion 42 formed in the housing 12. The upper end of the housing 12 is closed by a cup-shaped cap 44 having an annular lip portion 46. In an assembled condition, the lip portion 46 engages an O-ring 48 to maintain the latter in tight sealing engagement with the top edge of diaphragm 36 and the lip portion 46. The cap 44 may be held in fixed position in any conventional manner, for example, by threadably engaging the latter into the bore 42, by an adhesive or by a pressed fit.

The diaphragm 36 forms a chamber 50 within the cup-shaped member 44. The chamber 50 communicates with an opening 52 in the member 44 which is in alignment and communicates with a passage 54 formed in a fitting portion 56 extending from one side of the housing 12. The fitting 56 is adapted to be connected by means of a hose or the like, not shown, to the intake manifold of an automotive engine so that the chamber 50 is subject to intake manifold pressure when the engine is in operation. Variations in the manifold pressure serves to deflect the diaphragm 36 and to move the piston 30 in the bore 24 of the sleeve 18 for a purpose to be described.

As shown in FIG. 1, the gauge 10 is intended to be disposed in a substantially vertical position with a substantial portion of the bore 12 below the diaphragm 36 occupied with a quantity of colored liquid. The colored liquid can be alcohol with coloring material added or any other colored liquid of relatively low viscosity which will not freeze or from which the coloring additive will not separate. Preferably the quantity of liquid disposed in the cavity is sufficient to fill all of the spaces below the lip 26 of the sleeve 18, that is, a chamber 58 below the piston 30, the groove 20 and the reservoir 32 and the portion of the sleeve bore 24 above the piston 50.

Upward sliding movement of the piston 30 from the position in which it is shown in FIG. 1, causes the cavity 58 below the piston 30 to enlarge so that the level of fluid in the communicating groove 20 drops. Return motion of the piston 30 in a downward direction serves to displace liquid from the cavity 58 through the notch 22 and upwardly in the groove 20 so that it is returned to the reservoir 32 when the piston reaches its lower position as seen in FIG. 1.

The entire gauge 10, with the exception of the brass diaphragm 36, preferably is made of plastic material. The housing 12 is made of lucite or any other transparent plastic material while the sleeve 18, the piston 50 and the cap 44 can be made of a pigmented or colored plastic material such as Delrin, for example. The various plastic parts may be made in any conventional manner such as by injection molding.

Figure 3:
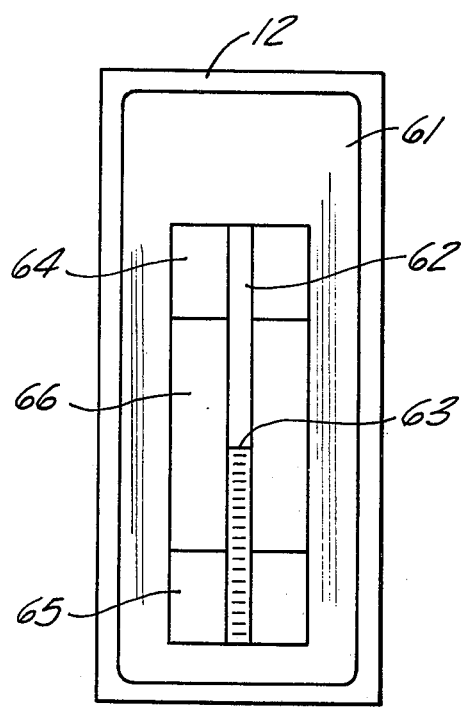
FIG. 3 is a plan view taken from the right side of the indicating instrument shown in FIG. 1.

As best seen in FIG. 3, the exterior surface of the housing 12 can be covered by a cover member such as a decalcomania indicated at 61. The cover member 61 may bear any form of indicia adjacent to an elongated opening 62 which is positioned in alignment with the elongated slot 20. The opening 62 makes it possible to see through the transparent housing and view the liquid level indicated at 63 in FIG. 3 in the groove 20.

The groove or slot 20 is dimensioned to have a uniform cross-section for its entire length which is substantially equal in cross-sectional area to the clearance area or the annular area between the piston 30 and the interior wall 24 of the tubular sleeve 18. The level of the liquid in the groove 20 and in the clearance space between the piston and the bore 24 of the tubular sleeve 18 will be maintained at substantially equal levels and the equal areas of the slot 20 and the clearance space are necessary to insure that for any increment of movement of the piston 30, a given change in the liquid level in the groove 20 will result for all positions of the piston 30 in its full range of movement.

The area of the groove 20 is selected to be of some very small portion of the area of the piston 30. For example, in a preferred embodiment of the invention, the piston area was selected to be 200 times the area of the groove 20. As a result, movement of the piston some minute amount results in a substantial change in the level of the liquid in the groove 20. If, for example, the piston moves 1/1000 of an inch, the liquid level in groove 20 would change 2/10 of an inch. In this manner, the results of the movement of the piston is greatly magnified or multiplied in the groove 20.

Installed on the vehicle in a vertical position and with the engine not operating, the various components of the gauge 10 will occupy the position shown in FIG. 1 with the piston 30 in a lower position in the sleeve bore 24' and with liquid in the reservoir 32 and in all of the spaces and cavities below the sleeve lip 26. When the engine is operating, a vacuum pressure is established at the intake manifold of the engine and also in the chamber 50 above the diaphragm 36. The pressure below the diaphragm 36 is substantially at atmospheric pressure so that the diaphragm will be deflected upwardly causing the piston 30 to be raised. Raising or upward movement of the piston 30 will enlarge the cavity 58 so that liquid in the groove 20 will pass through the notch 22 into the cavity 58 and will establish a liquid level in the groove 20 which can be observed through the transparent housing 12 and compared with markings or indicia adjacent to the opening 62.

When the engine is operating at some predetermined speed with the piston 30 raised and the loading on the engine is increased, the diaphragm 36 will tend to deflect downwardly toward its static or original position so that the piston 20 is moved downwardly. The fluid in the cavity 58 below the piston 30 will be forced through the notch 22 to raise the liquid level in the groove 20 to a higher level. Such a higher level could well be marked with indicia designated 64 in FIG. 3 to indicate poor fuel utilization or economy. In the same manner, when the load on the engine is decreased, the diaphragm 36 will deflect upwardly due to the reduction in pressure in the cavity 50 so that the liquid level will drop in the groove 20. In such an instance, liquid level may drop to the lower end of the groove 20 to indicate good fuel utilization or economy and the scale on the cover member 61 can be marked accordingly in the area designated 65. Indicia also could be provided as designated at 66 between the two extremes of high and low liquid levels to indicate average fuel utilization or economy.

Figure 4:
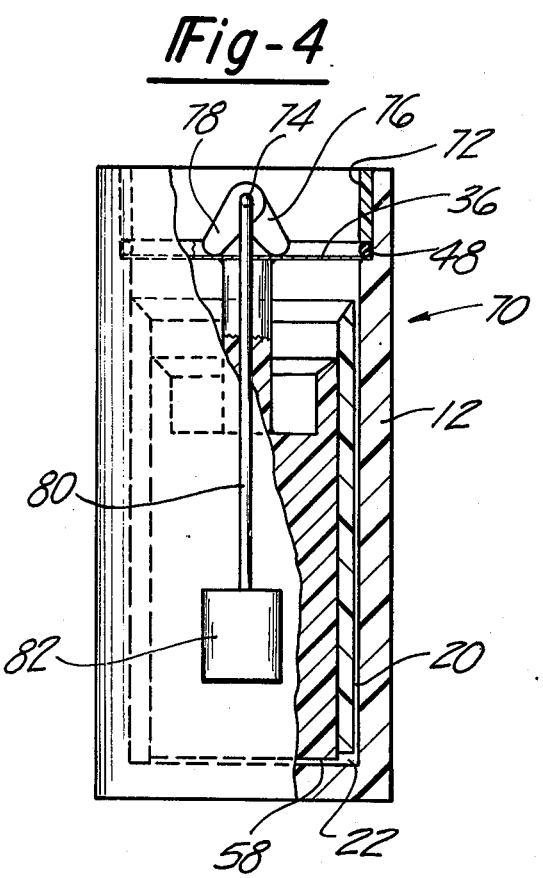
FIG. 4 is a view similar to FIG. 1, partly in section, showing a modified form of the invention.

Referring now to FIG. 4, a modification of the invention is shown in which a gauge 70 can be identical in construction to the gauge 10 below the diaphragm 36. Above the diaphragm, the cup shaped member 44 is replaced with a tubular collar 72 fastened in the upper end of the housing 12 to maintain the O-ring 48 in tight sealing engagement with the diaphragm 36. A generally diametrically disposed shaft 74 is rotatably journaled in diametrically opposed walls of the housing 12 and sleeve 72. A pair of cam elements 76 and 78 are rigidly connected to the shaft 74 for rotation therewith, and have lower end portions adapted to engage the upper surface of the diaphragm 36. At least one end of the shaft 74 projects through the wall of the housing 12, and is provided with a pendulum arm 80, the lower end of which is provided with a weight or ballast element 82. Swinging movement of the pendulum arm 80 serves to move the cam elements 76 or 78 to deflect the diaphragm 36 downwardly, as seen in FIG. 4.

In the modified version of the invention shown in FIG. 4, the housing 12 is provided with only a small quantity of liquid so that the chamber 58 below the piston 30, notch 22 and the lower portion of the groove 20 are filled with a colored liquid when the gauge 70 is disposed in a vertical position.

The gauge 70 is adapted to be mounted on a vehicle so that the shaft 74 extends generally transversly to the direction of travel. Starting from the position shown in FIG. 4, if the vehicle is accelerated so that the gauge 70 moves to the right, as seen in FIG. 4, the pendulum 80 and ballast 82 will tend to swing to the left in a clockwise direction to rotate the lower end of the cam 76 downwardly. This causes the diaphragm 36 to be deflected downwardly and to move the piston to displace liquid from the chamber 58 and into the groove 20. After the vehicle attains a more or less uniform speed the pendulum 80 will return to the position shown to permit the diaphragm 36 to return to its original position. This causes a raising movement of the piston 30 and an enlargement of the chamber 58 which results in the level of liquid in the groove 20 resuming its original low level. Thereafter, if the vehicle is decelerated, as by braking, the pendulum 80 and weight 82 will tend to swing to the right as seen in FIG. 4, in a counter-clockwise to deflect the diaphragm 36 downwardly and to move the piston 30 downwardly. Such downward movement of the piston will cause the liquid level to again raise in the groove 20.

When the gauge 70 is used to indicate acceleration and deceleration the area of the cover member 62 indicated at 64, can be provided with a zone or marking to indicate to the observer that acceleration or deceleration is occuring.

An indicating instrument or gauge has been provided which can be used with a vehicle engine or with a vehicle to indicate the economy or efficiency of fuel utilization or acceleration and deceleration of the vehicle. The mechanism employed in the gauge is a piston which is moved in accordance with either variations in engine manifold pressure or acceleration and deceleration of the vehicle to change the size of a fluid receiving cavity which controls the level of the liquid in a column which may be observed by the driver through a transparent housing of the gauge.

The embodiments of the invention in which an exclusive property or privelege is claimed are defined as follows:

1. An instrument for indicating the operating characteristics of a vehicle, the combination of; a housing forming a cavity therein, a diaphragm disposed in said housing and enclosing one end of said cavity, a piston disposed in said cavity and forming a first chamber in said cavity between said diaphragm and said piston and at one side of the latter, said piston forming a second chamber at the other side of said piston, passage means including an elongated conduit formed in said housing adjacent an outer wall of the latter and communicating said first and second chambers with each other, said conduit extending parallel to the axis of said piston and having a uniform cross-sectional area throughout its length, means connecting said diaphragm and said piston for movement of the latter in response to movement of said diaphragm, a quantity of liquid in said second chamber, means in said vehicle for moving said diaphragm to change the level of liquid in said passage means, said liquid being displaceable into said passage means upon movement of said piston in one direction and being movable out of said passage means into said second chamber upon movement of said piston in the opposite direction, said piston having a surface in said chamber with an area substantially larger than the cross-sectional area of said conduit.

2. The combination of claim 1 in which said piston forms a clearance space between said piston and the walls of said cavity and in which cross-sectional area of said clearance space is substantially equal to the cross-sectional area of said conduit.

3. The combination of claim 1 in which said piston forms a liquid reservoir at its upper side for receiving liquid from and delivering liquid to said passage means.

4. An instrument for indicating the operating characteristics of a vehicle, the combination of; a housing forming a cavity therein, a diaphragm disposed in said housing and enclosing one end of said cavity, a piston disposed in said cavity and forming a first chamber in said cavity between said diaphragm and said piston and at one side of the latter, said piston forming a second chamber at the other side of said piston, passage means including an elongated conduit formed in said housing adjacent an outer wall of the latter and parallel to the axis of said piston, said conduit communicating said first and second chambers with each other, means connecting said diaphragm and said piston for movement of the latter in response to movement of said diaphragm, a quantity of liquid in said second chamber, and means for moving said diaphragm to change the level of liquid in said passage means, said liquid being displaceable into said passage means upon movement of said piston in one direction and being movable out of said passage means into said second chamber upon movement of said piston in the opposite direction, said conduit terminating in said first chamber at a point above said piston for all positions of the latter.

5. The combination of claim 4 in which said quantity of liquid is sufficient to fill said second chamber, said passage means and said first chamber below said point at which said conduit terminates in said first chamber.

6. The combination of claim 5 in which said piston forms a liquid reservoir at its upper side for delivering liquid to and receiving liquid from said conduit.

7. An instrument for indicating the operating characterisics of a vehicle, the combination of; a housing forming a cavity therein, a diaphragm disposed in said housing and enclosing one end of said cavity, a piston disposed in said cavity and forming a first chamber in said cavity between said diaphragm and said piston and at one side of the latter, said piston forming a second chamber at the other side of said piston, passage means formed in said housing adjacent an outer wall of the latter and communicating said first and second chambers with each other, means connecting said diaphragm and said piston for movement of the latter in response to movement of said diaphragm, a quantity of liquid in said second chamber, means for moving said diaphragm to change the level of liquid in said passage means, said liquid being displaceable into said passage means upon movement of said piston in one direction and being movable out of said passage means into said second chamber upon movement of said piston in the opposite direction, said diaphragm forming a third chamber in said housing at a side opposite to said first chamber, and means communicating said third chamber with an engine manifold, said diaphragm being deflectable upon variations of vacuum pressure in said chamber to move said piston means.

8. An instrument for indicating the operating characteristics of a vehicle, the combination of; a housing forming a cavity therein, a diaphragm disposed in said housing and enclosing one end of said cavity, a piston disposed in said cavity and forming a first chamber in said cavity between said diaphragm and said piston and at one side of the latter, said piston forming a second chamber at the other side of said piston, passage means formed in said housing adjacent an outer wall of the latter and communicating said first and second chambers with each other, means connecting said diaphragm and said piston for movement of the latter in response to movement of said diaphragm, a quantity of liquid in said second chamber, means in said vehicle for moving said diaphragm to change the level of liquid in said passage means, said liquid being displaceable into said passage means upon movement of said piston in one direction and being movable out of said passage means into said second chamber upon movement of said piston in the opposite direction, and pendulum means responsive to acceleration and deceleration of a vehicle to move said diaphragm.

9. The combination of claim 8 and further comprising a shaft rotatably supported relative to said housing and adapted to be disposed transversly to the direction of the motion of a vehicle, said pendulum means being connected to said shaft, and cam means rotatable with said shaft to engage and deflect said diaphragm downwardly upon movement of said pendulum means.

10. An instrument for indicating the operating characteristics of a vehicle, the combination of; a housing forming a cavity therein, a diaphragm disposed in said housing and enclosing one end of said cavity, a piston disposed in said cavity and forming a first chamber in said cavity between said diaphragm and said piston and at one side of the latter, said piston forming a second chamber at the other side of said piston, passage means formed in said housing adjacent an outer wall of the latter and communicating said first and second chambers with each other, means connecting said diaphragm and said piston for movement of the latter in response to movement of said diaphragm, a quantity of liquid in said second chamber, and means for moving said diaphragm to change the level of liquid in said passage means, said liquid being displaceable into said passage means upon movement of said piston in one direction and being movable out of said passage means into said second chamber upon movement of said piston in the opposite direction, said housing having an elongated bore and in which a tubular sleeve is disposed in said bore to form said cavity, said passage means being formed between said sleeve and the wall of said bore.

11. An instrument for indicating fuel economy comprising:
 a housing,
 a diaphragm disposed in said housing and forming a chamber communicating with an engine manifold and being deflectable upon variation of vacuum pressure in said chamber,
 a piston slidably disposed in said housing and connected to said diaphragm for movement upon deflection of said diaphragm, said piston being movable between first and second positions,
 passage means formed in said housing adjacent an outer wall of the latter and communicating with chambers at opposite sides of said piston,
 a volume of liquid disposed in said housing to occupy the space below said piston and in said passage means when said piston is in said first position, said piston being movable towards said second position to enlarge said chamber below said piston to receive fluid from said passage means upon a variation of pressure in said diaphragm chamber, and
 means formed in said housing for viewing the level of liquid in said passage means.

12. The combination of claim 11 in which said passage means are elongated and extend from a point below said piston to a point above said piston and in a path generally parallel to the axis of movement of said piston.

13. The combination of claim 11 in which said passage means has a smaller cross-sectional area than the area of said piston whereby, movement of said piston to change the liquid level in said passage means results in a greater change in the liquid level in said passage means.

* * * * *